April 25, 1933.  J. B. SINDERSON  1,905,310
METHOD OF AND MACHINE FOR HOBBING GEARS AND THE LIKE
Filed May 9, 1928  4 Sheets-Sheet 1

INVENTOR
John B. Sinderson
BY
ATTORNEYS

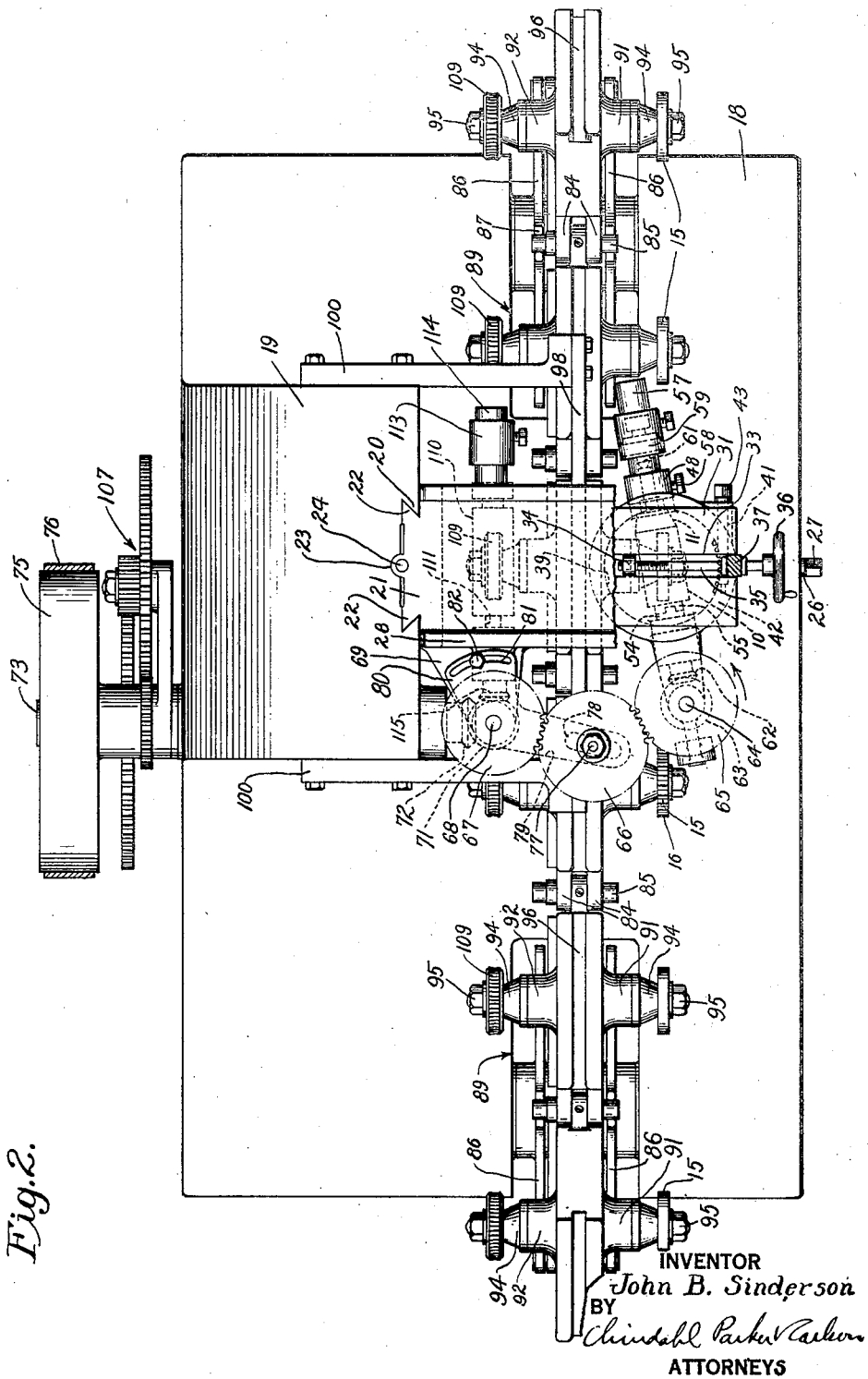

April 25, 1933.  J. B. SINDERSON  1,905,310
METHOD OF AND MACHINE FOR HOBBING GEARS AND THE LIKE
Filed May 9, 1928  4 Sheets-Sheet 3
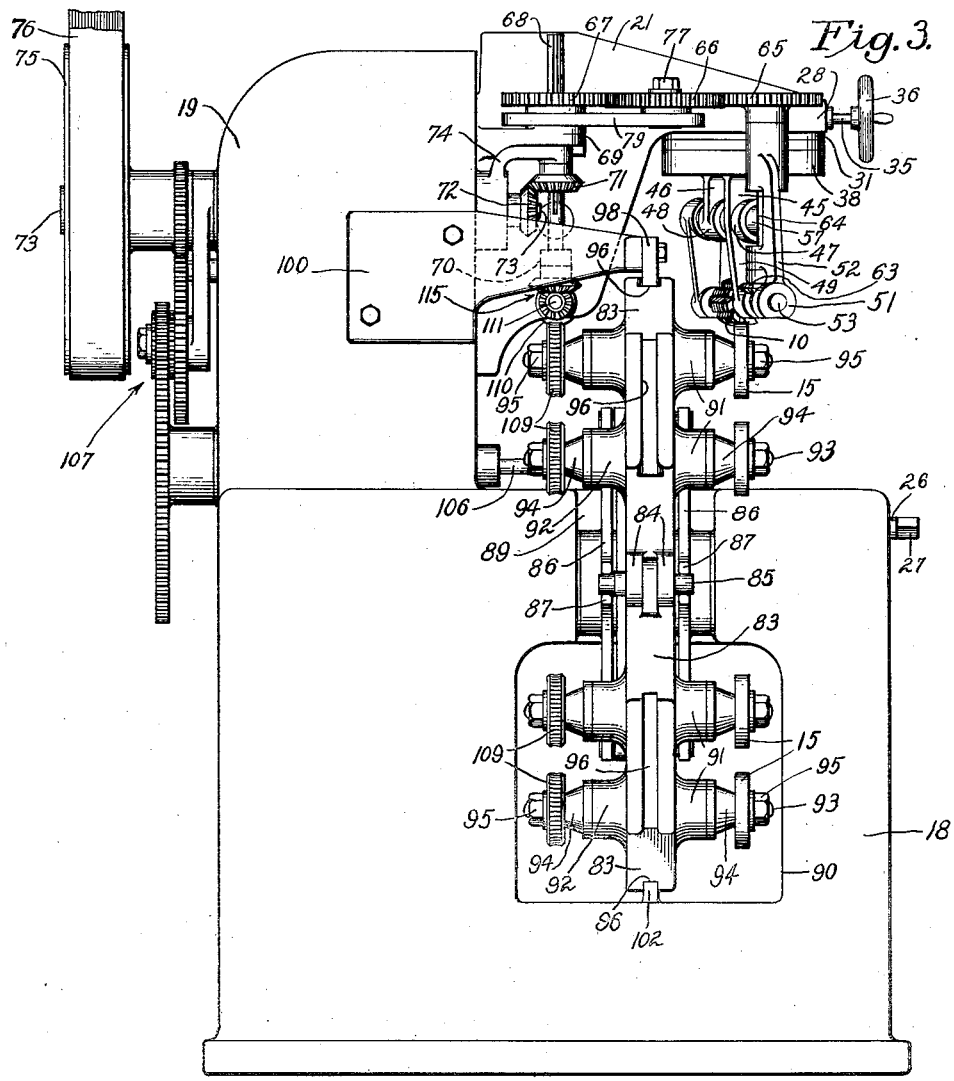
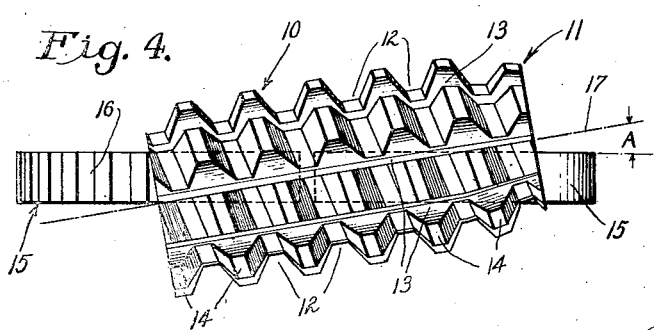
INVENTOR
John B. Sinderson
BY
ATTORNEYS April 25, 1933.   J. B. SINDERSON   1,905,310
METHOD OF AND MACHINE FOR HOBBING GEARS AND THE LIKE
Filed May 9, 1928   4 Sheets-Sheet 4

INVENTOR
John B. Sinderson
BY
ATTORNEYS

Patented Apr. 25, 1933

1,905,310

UNITED STATES PATENT OFFICE

JOHN B. SINDERSON, OF ROCKFORD, ILLINOIS, ASSIGNOR TO BARBER-COLMAN COMPANY, OF ROCKFORD, ILLINOIS, A CORPORATION OF ILLINOIS

METHOD OF AND MACHINE FOR HOBBING GEARS AND THE LIKE

Application filed May 9, 1928. Serial No. 276,208.

The present invention relates to improvements in cutting toothed elements, such for example as spur gears and spiral gears, etc., and has particular reference to a new and improved method and machine for this purpose.

An important object of the present invention resides in the provision of a novel method of and machine for continuously hobbing a series of gear blanks without the necessity of backing up and resetting the hob.

Other important objects reside in the provision of a new and improved method of and machine for hobbing gears, in which the teeth are cut straight and without the necessity of shifting the hob laterally of the tooth zone, and in which wear on the hob is distributed over the length.

A general object is to provide a novel method and machine whereby toothed elements can be hobbed correctly, efficiently, quickly and cheaply.

Still another object resides in the provision of a novel method of hobbing rotary members with peripheral projections or teeth in which the member and the hob are fed relatively to each other through cutting engagement along a path inclined to the hob axis, and during such engagement are rotated in timed relation to each other and the relative feeding movement, so that the general longitudinal form of the hob, i. e., the cylindrical form in the case of spur gears, will be projected along the path of feeding movement to produce a foreshortened form on each projection along the axis of rotation of the member.

Further objects and advantages will become apparent as the description proceeds.

In the accompanying drawings, Figure 1 is a fragmentary view in front elevation of a machine embodying the features of my invention.

Fig. 2 is a plan view of the machine.

Fig. 3 is a left end view of the machine.

Fig. 4 is a diagrammatic view illustrating a method embodying the features of my invention.

Figure 1:
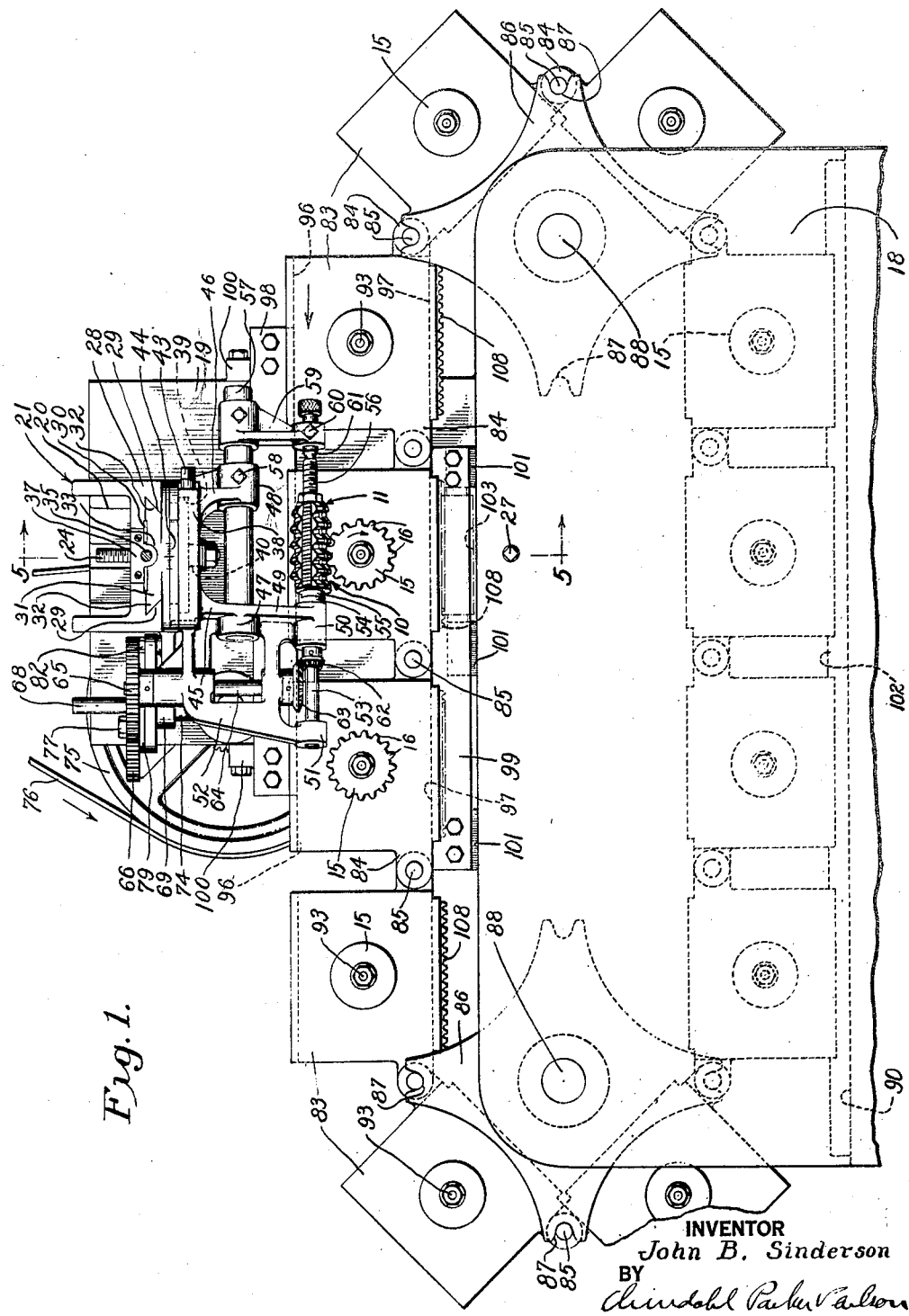

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative construction falling within the spirit and scope of the invention as expressed in the appended claims.

In carrying out the invention, a hob of suitable construction, such as the single thread hob 10 shown in Fig. 4, is employed. Preferably, the forward end of the hob 10 is reduced in size to form a gradually tapering nose 11, and in other respects the hob may be standard, having one or more spiral grooves 12 intersected by generally longitudinal flutes 13 to form teeth 14 which are suitably relieved. The nose 11 prevents a cut to full depth when the hob and the blank first engage, and serves to produce a gradual roughing cut.

The invention contemplates the cutting of toothed projections without of necessity shifting the hob laterally of the work blank, so that a plurality of work blanks may, if desired, be passed successively in a continuous series across the hob in a direction generally longitudinally of the hob, and in this connection may be availed of to cut a large variety of work blanks. However, the invention is particularly adapted for the cutting of spur gears, and therefore is illustrated in the drawings in connection with a plurality of spur gears 15 having straight parallel accurately pitched teeth 16. The number of teeth to be generated is dependent on the diameter of the gear, and hence the diameter is made to suit the number and pitch of teeth desired. It will be understood that the invention in its broad aspects is not limited to the cutting of spur gears, but may be applied to the cutting of gear racks as illustrated in my copending application Serial No. 266,611, filed April 2, 1928, and in general to the cutting of peripheral tooth projections on cylindrical parts.

In positioning the hob 10 in cutting relation to the gear blank 15, it is inclined longitudinally at an angle, designated as A. If straight teeth are to be generated, this angle must correspond to the helix angle of the hob. If the hob is inclined at a different angle than the helix angle, a spiral gear will be obtained.

The minimum or effective length of the hob bears a definite relation to the angle A and the width of the blank 15, and is such that the axial center line, designated as 17, of the hob along the full diameter extends diagonally completely across the blank. The center of the hob cuts the depth, and hence at the start, one edge of the blank being immediately under the center of the hob is cut to depth. As the blank 15 is rolled relatively along the hob 10, the depth cut moves toward the other side edge of the blank, thus generating a straight tooth of uniform cross-section. Hence, the cutting action is gradual, most of the cut being preparatory to the final cut. The nose 11 produces an initial roughing cut, thereby making the action still more gradual, and avoids taking a full depth cut, the moment the blank and the hob are brought into engagement.

The minimum length of the hob, exclusive of the nose, may be expressed as follows: $L = W \csc A$, where $L$ = the minimum or effective length of the hob, $W$ = the width of the gear blank, and $A$ = the angle of the hob relative to the blank.

A single gear blank or a series of gear blanks may be passed relatively along the hob. The method thus permits the continuous hobbing of gears with straight teeth and at a high speed. Gear blanks may be added continuously to the series, and finished blanks taken away, and the speed is limited only by the general strength and rigidity of the mechanism. The method lends itself particularly to finish hobbing gear blanks that have had a roughing cut. The cut is gradual, and wear on the hob is evenly distributed throughout its effective length. No lateral shifting of the hob is necessary, and hence but little space is required for carrying on the operation.

In-so-far as the method is concerned, any suitable machine comprising means for supporting the hob and the work blank in correct cutting relation, means for rotating the hob, and means for effecting a correct relative generally longitudinal movement between the hob and the blank may be employed.

Figure 5:
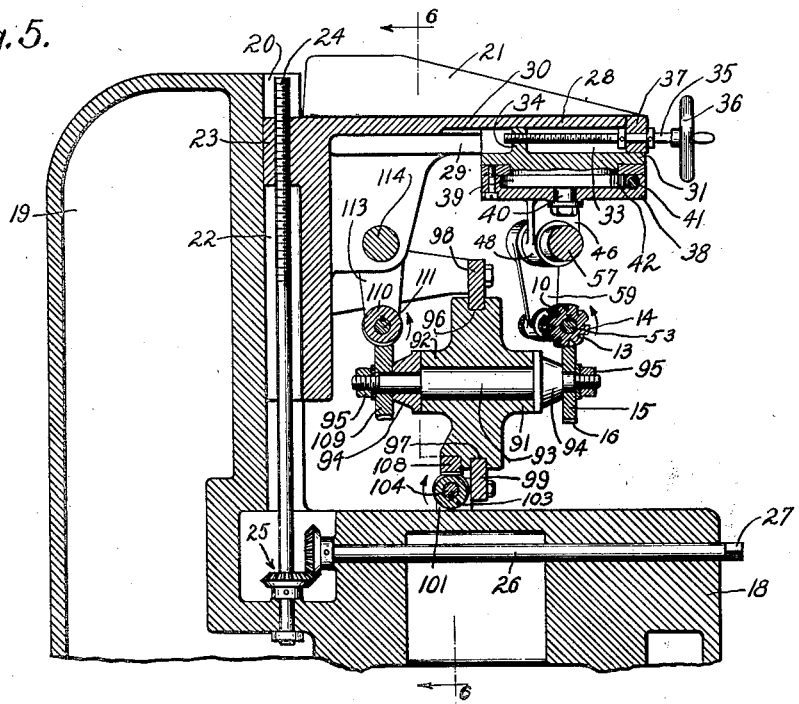
Fig. 5 is a fragmentary vertical sectional view taken along line 5—5 of Fig. 1.
Figure 6:
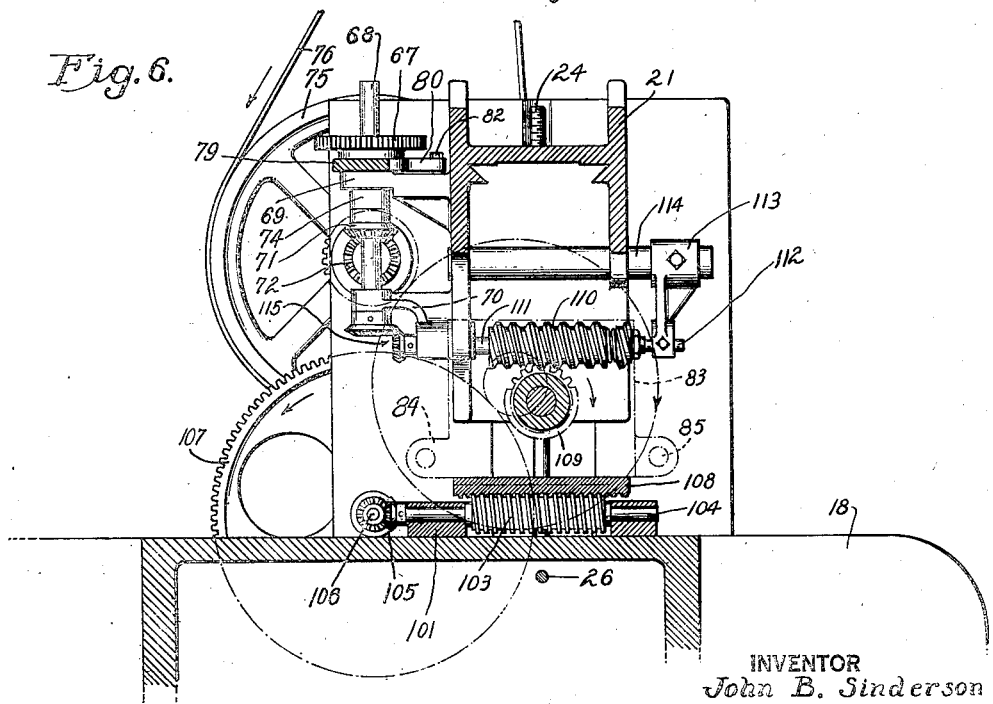
Fig. 6 is a fragmentary vertical sectional view taken along line 6—6 of Fig. 5.

In the drawings, I have illustrated the preferred form of machine. This machine comprises a suitable base 18, preferably horizontal. Extending up from the rear of the base 18 is a suitable column 19 formed in its front face with suitable guideways 20. A head 21 having suitable guides 22 disposed in the guideways 20 is mounted for vertical adjustment on the column 19. To this end, a lug 23 on the head 21 has a threaded engagement with the free upper end of an adjusting screw 24 (see Fig. 5) anchored at its lower end in the base 10. The screw 24 is connected through bevel gears 25 to a shaft 26 extending through the base 10 to the front of the machine, and having a squared end 27 for an adjusting tool (not shown).

The head 21 has a lateral extension 28 which projects forwardly over the base, and which is formed on its underside with suitable longitudinal guideways 29 and a longitudinal channel 30 centrally between the guideways. A slide 31 having suitable guides 32 disposed in the guideways 29 is mounted for adjustment along the extension 28. To this end, the slide is formed in its upper face and between the guides 32 with a longitudinal channel 33 in opposed relation to the channel 30 and with a nut 34 preferably integral therewith and projecting upwardly into the channel 30. An adjusting screw 35 having a suitable hand wheel 36 on its forward end is journaled against end-wise movement in a lug 37 depending from the front end of the extension 28 into the channel 33, and extends rearwardly into threaded engagement with the nut 34.

Pivotally mounted by any suitable means on the underside of the slide 31 is a saddle 38. In the present instance, the saddle 38 embraces a circular plate 39 formed on the underside of the slide 31, and is adjustable about a stud 40 depending axially from the plate. A worm 41 mounted in the saddle 38 meshes with a gear segment 42 formed on the periphery of the plate 39, and has a shaft 43 extending out from said saddle for engagement by a tool (not shown) for effecting an adjustment. The angular position of adjustment may be indicated by suitable graduations 44 on the slide 31 and the saddle 38.

The saddle carries suitable means for supporting the hob 10 in operative position. To this end, the saddle is formed with two parallel spaced depending arms 45 and 46 having axially alined sleeves 47 and 48 respectively. The arm 45 has an extension 49 formed with a bearing sleeve 50 on its lower end. Journaled in the bearing sleeve 50 and in an aligned sleeve 51, formed in a bearing bracket 52 preferably integral with the outside of the arm 45 and extension 49, is a suitable spindle 53. One end of the spindle 53 has a clutch element 54 adapted to coact with a clutch element 55 on an arbor 56 for the hob 10 to support and drive the latter. Extending through the sleeves 47 and 48 is a horizontal rod 57 adapted to be clamped in position by means of a suitable clamp nut 58. A supporting strap 59 is adjustably secured on the end of the rod 57 remote from the arm 45. Adjustably secured in the lower end of the strap 59 by means of a clamp screw 60 is a center 61 for supporting the free end of the arbor 56.

Any suitable means may be provided for continuously rotating the hob 10. In the present instance, the spindle 53 is connected through bevel gears 62, 63 to a vertical shaft 64 journaled in the bracket 52; the shaft 64 is connected through speed change gears 65, 66, 67 to a spline shaft 68 journaled in vertically spaced brackets 69 and 70 formed on the side of the head 21; and the shaft 68 is connected through bevel gears 71, 72 to a horizontal shaft 73 extending rearwardly through the column 19. The gear 71 is splined to the shaft 68 and is held in mesh with the gear 72 by an arm 74 extending forwardly from the column 19. The rear end of the shaft 73 is provided with a pulley 75 in engagement with a belt 76 adapted to be connected to a suitable source of power (not shown). The intermediate speed change gear 66 is mounted on a stud 77 adjustably secured in a slot 78 in the free end of an arm 79 pivotally adjustable about the axis of the shaft 68. The arm 79 has a laterally projecting segment 80 which overlies the bracket 70 and which has an arcuate slot 81 adapted to be engaged by a suitable clamp bolt 82.

Any suitable means may be provided for presenting the gear blanks 15 singly or in series to the hob 10. In the present instance, this means comprises a suitable work carriage 83 for each blank. Preferably, the carriages 83 are linked together to provide a work carrier in the form of a continuous chain. To this end, the ends of the carriages 83 are formed with overlapping lugs 84 pivotally connected by means of suitable pins 85. The carrier chain runs over and is held in position by a pair of spaced sprocket rollers 86, but is free thereon. Preferably, each roller 86 is in the form of a double plate star wheel having suitable notches 87 in the ends of the projections adapted to engage the opposite ends of the pivot pins 85. The rollers 86 are rotatably mounted on shafts 88 in suitable recesses 89 in opposite ends of the base 18. The work carrier in running over the rollers 86 passes in one direction along the top of the base directly under the hob 10, and in the other direction through a longitudinal opening 90 extending through the base 18.

Preferably, the carriages 83 are alike in construction so that a description of one will suffice for all. Each carriage comprises a rectangular body with central tubular projections 91 and 92 on opposite sides. A suitable work spindle 93 extending through the tubular projections 91 and 92 is freely rotatable in the body. Preferably, the outer ends of the spindle 93 are reduced in size, and suitable tapered clamp washers 94 are secured thereon against the ends of the projections 91 and 92. Suitable clamp nuts 95 are adapted to be threaded onto the front and rear ends of the spindle 93. The work blank 15 is adapted to be secured on the forward end of the spindle between the front washer 94 and nut 95.

Means is provided for constraining the work carrier to move across the hob 10 so that the center of each blank 15 will move in a plane exactly parallel to the pitch outline of the teeth on the hob. Preferably, each work carrier 83 is formed in its outer and inner surfaces with longitudinal grooves or guideways 96 and 97. As the carriages 83 pass over the base 18 in proximity to the cutting range, the guideways 96 are adapted to engage an upper guide bar 98, and the guideways 97 are adapted to engage a lower guide bar 99. Preferably, the upper guide bar 98 spans and is rigidly secured to the forward ends of a pair of supporting arms 100 secured to opposite sides of the column 19, and the lower guide bar 99 is rigidly secured to a plurality of upstanding lugs 101 on the base 18. As the carriages 83 move through the base 18, the guideways 96 engage a single elongated guide bar 102 mounted on the floor of the opening 90.

Suitable means is provided for driving the work carrier to move the work blanks along the hob. In the present instance, this means comprises a suitable feed worm 103 mounted on a shaft 104 journaled in the lugs 101. The shaft 104 is connected through bevel gear 105 to a shaft 106 extending rearwardly through the column 19; and the rear end of the shaft 106 is connected through a speed change reduction gearing 107 to the pulley 75. Provided on the inner side of each work carriage 83 is a suitable gear rack 108 adapted to mesh with the feed worm 103. Preferably, the gear racks 108 are of such length that the worm 103 will engage an oncoming rack before moving out of engagement with the preceding rack, thus insuring a continuity of drive. The rate of feed bears no definite relation to the rotation of the hob, and may be varied by adjusting the gearing 107 to obtain a maximum output. The rate of feed may be as rapid as the cutting action and the strength and rigidity of the apparatus will permit.

The work blank is free to rotate on the work holder, and the cutting action tends to rotate and properly index the blank. However, preferably means is provided for positively indexing the work blank. In the present instance, this means comprises a suitable worm wheel 109 mounted on the rear end of the spindle 93 between the rear washer 94 and nut 95. Meshing with the worm wheel 109 is a worm 110 mounted on a spindle 111 journaled at one end in the bracket 70. The free end of the spindle 111 is engaged by a suitable center 112 adjustably secured in a depending strap 113 adjustably secured on a rod 114 in the head 21. The other end of the spindle 111 is connected through bevel gears 115 to the lower end of the spline shaft 68. The worm 110 has the same lead and rotates at the same speed as the hob 10, and the worm wheel 109 has the same number of teeth as the gear being cut.

The operation will now be briefly described. The hob 10 is adjusted to the desired angle. This angle is equal to the lead angle when straight teeth are to be cut, and varies from the lead angle when spiral teeth are to be cut. Gear blanks are mounted on the carriages 83 at the right end of the machine, are fed in series along the hob, and are removed as finished gears at the left end of the machine. The hob 10 is rotated and the gear blanks are fed along the hob at any desired speed. The blank is indexed positively by the worm wheel 109 and worm 110.

As the blank moves into engagement with the hob 10, it first engages the nose 11 which does not cut to depth but which takes a preliminary or roughing cut along one edge. As the blank is fed along the hob 10, the cut to depth shifts from one edge to the other to generate straight uniform teeth.

The operation can continue without resetting the hob until it becomes necessary to resharpen the hob. No lateral shifting of the hob is necessary. The method is simple, expeditious, and accurate, and the only attention required is the mounting of blanks on the carriages 83 and removal therefrom of the finished gears. The method is particularly adapted for finishing gears that have been hobbed in a roughing operation.

I claim as my invention:

1. The method of hobbing gears comprising moving a gear blank relatively along a rotating hob, the hob being inclined longitudinally to the direction of said movement so that the effective length of the hob extends diagonally completely across the blank.

2. The method of continuously hobbing gears comprising moving a gear blank relatively along a rotating hob through cutting engagement therewith, the hob being inclined at an angle to the direction of movement corresponding to the angle of the hob thread, and having its effective length extending diagonally completely across the blank.

3. The method of continuously hobbing gears comprising moving a gear blank relatively along a rotating hob, the hob being inclined at an angle to the direction of movement corresponding to the angle of the hob thread, and having its effective length extending completely across the blank, and rotating the gear blank while in cutting engagement with the hob.

4. The method of continuously hobbing gears comprising rotating a hob in a fixed position, moving a series of gear blanks along said hob, said hob being inclined to the direction of movement and having its effective length extending diagonally across each blank when the latter is in engagement therewith, and rotating each blank when in engagement with said hob in timed relation to the rotation of said hob.

5. A machine for hobbing gears comprising, in combination, a hob, means for supporting said hob, means for continuously rotating said hob, a work carrier for moving a gear blank along said hob, said hob being inclined at an angle to said movement and having its effective length extending diagonally across the blank.

6. A machine for hobbing gears and the like comprising, in combination, a hob, means for supporting said hob, means for continuously rotating said hob, a work carrier for relatively moving a work blank along said hob, said hob being inclined at an angle to said movement and having its effective length extending diagonally across the tooth zone of the blank, and means for rotating the blank in timed relation to the rotation of said hob during movement of the blank along said hob.

7. A machine for hobbing gears comprising, in combination, means for supporting a hob, means for continuously rotating the hob, a work carrier for moving a gear blank along said hob, said hob being inclined at an angle to said movement corresponding to the helix angle of the hob threads, and having its effective length extending diagonally across the width of the blank.

8. A machine for hobbing gears comprising, in combination, means for supporting a hob for rotation in fixed position, said means being universally adjustable, a continuous work carrier comprising a plurality of individual work carriages each adapted to support a work blank, means for driving said carrier continuously, means for guiding said carrier along said hob, said hob being adapted to be inclined at an angle to said movement, and means for rotating said work blank on each carriage while it is in cutting engagement with said hob.

9. A machine for hobbing gears comprising, in combination, a base, a continuous work carrier mounted for movement over and through said base, said carrier comprising a plurality of carriages, each carriage having a work spindle for a gear blank, means for adjustably mounting a hob over said carrier in position to engage said blanks, said hob being adapted to be inclined longitudinally at an angle to the direction of movement of said blanks, means for continuously rotating said hob, means for guiding said carriages so as to constrain each work blank to be moved in the plane of the pitch outline of the teeth on the hob, each carriage being formed with a gear rack along its inner edge, and a feed worm adapted to mesh with said racks to drive said carrier, said feed worm being of such length that the succeeding carriage is engaged before the preceding carriage is disengaged.

10. A machine for hobbing gears comprising, in combination, means for supporting a hob for rotation in fixed position, said means being universally adjustable, a continuous work carrier comprising a plurality of individual work carriages each adapted to support a work blank, means for guiding said carrier for movement along said hob, means for driving said carrier continuously, and means for rotating said work blank on each carriage while it is in cutting engagement with the hob.

11. A machine for hobbing gears comprising, in combination, a base, a continuous carrier mounted for movement over and under said base, said carrier comprising a plurality of carriages, each having a work spindle for a gear blank, means for adjustably mounting a hob over said carrier in position to engage said blanks, means for rotating said hob, means for guiding said carriages in their movement along said hob, and means for driving said carrier continuously during engagement of said hob with each blank.

12. The method of hobbing gears comprising moving a gear blank relatively along a rotating hob, the hob being inclined longitudinally to the direction of said movement so that the effective length of the hob extends diagonally completely across the blank, and rotating the gear blank while in cutting engagement with the hob.

13. A machine for hobbing gears comprising, in combination, a hob, means for supporting said hob, means for continuously rotating said hob, a continuous carrier mounted for movement along said hob and comprising a plurality of carriages, each having a work spindle for a gear blank, said hob being inclined at an angle to the movement of said carrier and having its effective length extending diagonally across each blank as the latter is brought into operative relation thereto, means for driving said carrier, and means for rotating each blank when the latter is in operative relation to said hob.

14. The method of hobbing a rotary cylindrical member with elongated laterally alined peripheral projections of a predetermined length that are parallel to the axis, straight and uniform in width from end to end, which comprises relatively feeding the member in a rectilinear path perpendicular to its axis through cutting engagement with a rotating hob of a uniform lead, the hob being axially inclined to said path at an angle corresponding to its lead angle and being of a minimum length such that the projection of its axis along said path on an axial plane of the member is coextensive in length and position with the projections to be cut, and during said engagement rotating the member in timed relation to the rotation of the hob and the feeding movement relative thereto.

15. The method of hobbing a rotary cylindrical member with elongated laterally alined peripheral projections of a predetermined length that are straight and parallel to its axis, which comprises relatively feeding the member in a rectilinear path extending across said axis through cutting engagement with a rotating hob, the hob being axially inclined to said path at an angle corresponding to its lead angle and being of a minimum length such that the projection of its axis along said path on an axial plane of the member is coextensive in length and position with the projections, and during said engagement rotating the member in timed relation to the rotation of the hob and the feeding movement relative thereto.

16. The method of hobbing a rotary member with laterally alined projections in a peripheral zone of a predetermined width, which comprises relatively feeding the member in a rectilinear path perpendicular to its axis through cutting engagement with a rotating hob, the hob being axially inclined to said path and of a minimum length such that the projection of its axis along said path on an axial plane of the member is coextensive in width and location with said zone, and during said engagement rotating the member in timed relation to the rotation of the hob.

17. The method of hobbing a rotary member with laterally alined elongated projections in a zone of a predetermined width which comprises relatively feeding the member in a rectilinear path extending across the axis of the member through cutting engagement with a rotating hob, the hob being axially inclined to said path and being of a minimum length such that the projection of its axis along said path on an axial plane of the member is coextensive in width and position with said zone, and during said engagement rotating the member in timed relation to the rotation of the hob.

18. The method of hobbing gear members with a rotating hob having a cylindrical body portion and a tapered end nose, comprising relatively feeding the gear blank in a direction longitudinally of the tooth zone through cutting engagement with the rotating hob, the hob being inclined to said path to project axially across said zone and having the nose in advance axially at one side of said zone to cause the nose to make a roughing cut at one side of the zone and to cause the body portion to make a progressive cut from said side obliquely to the other side of said zone in the course of said feeding motion.

19. The method of hobbing a spur gear with straight peripheral teeth of uniform cross-section from end to end comprising relatively feeding the gear blank in a rectilinear path perpendicular to its axis through cutting engagement with a rotating hob of uniform lead axially disposed at an angle to said path so as to project axially diagonally across the tooth zone of the blank.

20. The method of hobbing a spur gear with straight teeth parallel to its axis comprising relatively feeding the gear blank in a rectilinear path across said axis through cutting engagement with a rotating hob axially disposed at an angle to said path and being of a minimum length such that the projection of its axis along said path on an axial plane of the blank is coextensive in length and position with the teeth to be cut.

21. The method of hobbing a rotary cylindrical member with elongated generally longitudinal laterally alined peripheral projections of a predetermined length, the projections being separated by elongated spaces of uniform depth having root surfaces concentric in form about the axis of rotation, said method comprising providing a hob having a cylindrical section with a hob thread of uniform height, constant lead and a predetermined longitudinal contour, rotating the hob, relatively feeding the member in a rectilinear path extending across said axis through cutting engagement with the hob, the hob being longitudinally inclined from a perpendicular to said axis at an angle corresponding to its lead angle, the hob section having an effective length such that the projection of its axis along said path on an axial plane of the member is coextensive in length and position with the projections to be cut, and during said engagement rotating the member in timed relation to the rotation of the hob and the feeding movement relative thereto.

22. The method of hobbing a rotary cylindrical member with elongated generally longitudinal laterally alined peripheral projections of a predetermined length, which comprises rotating a hob, relatively feeding said member in a path extending across its axis of rotation through cutting engagement with the hob, the hob being longitudinally inclined to said path and having a section with an effective length such that the projection of the axis of the section along said path on an axial plane of the member is coextensive in length and position with the projections to be cut, and during said engagement rotating the member in timed relation to the rotation of the hob and the feeding movement relative thereto.

23. A machine for hobbing a rotary member with generally longitudinal peripheral projections laterally alined in uniformly spaced relation about the axis of rotation, said machine comprising, in combination, a hob, means for supporting said hob, means for rotating said hob, a work support for presenting a member constituting the work blank to said hob, means for relatively feeding the blank and said hob along a rectilinear path through cutting engagement, said hob being axially inclined to a perpendicular to said axis of rotation at an angle corresponding to its lead angle and being axially inclined to said path, and means for rotating the blank in timed relation to the rotation and relative feed of said hob during said cutting engagement.

In testimony whereof, I have hereunto affixed my signature.

JOHN B. SINDERSON.